United States Patent Office 3,729,494
Patented Apr. 24, 1973

3,729,494
7α-METHYLANDROSTENOLONES
Helmut Hofmeister, Hermann Steinbeck, and Rudolf Wiechert, Berlin, Germany, assignors to Schering Aktiengesellschaft, Berlin, Germany
No Drawing. Filed Dec. 1, 1970, Ser. No. 94,152
Claims priority, application Germany, Dec. 6, 1969,
P 19 61 906.8
Int. Cl. C07c 169/22
U.S. Cl. 260—397.4                        8 Claims

ABSTRACT OF THE DISCLOSURE

7α-methyl-1α,2α-methylene-androstenolones of the formula

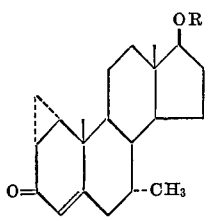

possess anabolic activity with minimal associated androgenic activity.

BACKGROUND OF THE INVENTION

This invention relates to 7α-methylandrostenolones.

SUMMARY OF THE INVENTION

The compounds of this invention are 7α-methyl-1α,2α-methylene-androstenolones of the formula

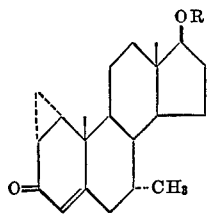

wherein R is hydrogen or acyl.

Examples of 17-esters of this invention are those wherein R is the acyl radical of an acid employed for esterification reactions in steroid chemistry. Preferred acids are organic carboxylic acids of up to 15 carbon atoms, especially lower (1–6) carbon atoms and intermediate (7–12) aliphatic carboxylic, preferably alkanoic acids. The acyl-radical can be unsaturated, branched, polybasic, or substituted in the usual manner, for example by hydroxy or amino groups or halogen atoms. Furthermore, suitable are also cycloaliphatic, aromatic, mixed aromatic-aliphatic (alkaryl and aralkyl), and heterocyclic acids which can likewise be substituted in the usual manner. Examples of preferred aryl groups are those of the following acids: acetic acid, propionic acid, caproic acid, enanthic acid, undecyclic acid, oleic acid, trimethylacetic acid, dichloroacetic acid, cyclopentylpropionic acid, phenylpropionic acid, phenylacetic acid, phenoxyacetic acid, dialkylaminoacetic acid, piperidinoacetic acid, succinic acid, benzoic acid, and others. For the production of water-soluble preparations, esters of dibasic organic and inorganic acids are especially suitable such as, for example, the esters of succinic, sulfuric and phosphoric acids.

It will be apparent to those skilled in the art that since activity resides in the steroid moiety, the exact nature of the ester group is not critical, so long as the acyl radical is that of a pharmaceutically acceptable acid, i.e., one which does not contribute significantly to the toxicity of the resulting ester.

Other examples of 17β-esterified hydroxy groups are those containing 1–18, preferably 2–12 carbon atoms, wherein the acyl group is the acyl radical of, for example, an aliphatic acid containing 1–18, preferably 1–6 carbon atoms, e.g., formic, butyric, isobutyric, α-ethylbutyric, valeric, isovaleric, α-ethylvaleric, trimethylacetic, 2-methylbutyric, 3-ethylbutyric, hexanoic, diethylacetic, triethylacetic, enanthic, octanoic, undecylic and palmitic, a cyclic acid, preferably a cycloaliphatic acid, containing, e.g., 5–18 carbon atoms, e.g., cyclopropylideneacetic, cyclobutylcarboxylic, cyclopentylcarboxylic, cyclopentylacetic, cyclohexyl, cyclohexylacetic and β-cyclohexylpropionic acid; a carbocyclic aryl or alkaryl acid, e.g., containing 6 to 18 carbon atoms, and 1 to 5, preferably 1 or 2 rings, e.g., benzoic, 2-, 3-, or 4-methylbenzoic, 2,3-, 2,4-, 2,5-, 2,6-, 3,4- and 3,5-dimethylbenzoic, ethylbenzoic, 2,3,6-trimethylbenzoic, cinnamic and 3-methyl-α-naphthoic acid; an aralkyl acid, e.g., containing 7 to 18 carbon atoms, e.g., β-phenylpropionic, diphenylacetic, biphenylacetic and α-naphthylacetic acid; a polybasic acid, e.g., containing 2–18 carbon atoms and 1 to 5 hydroxy groups, e.g., glycolic lactic, citric, tartaric, d-maleic, d-glyceric, mannonic, gluconic and salicylic acid; an amino acid, e.g., glycine, aminopropionic, methylglycine, dimethylglycine, diethylglycine, para-aminosalicylic and para-aminobenzoic acid; the corresponding acids containing one, two or more of simple substituents, e.g., halo, alkoxy, acyloxy, sulfonyloxy, amido, sulfato, nitro, mercapto, cyano, etc., in the molecule, e.g., ethylmercaptoacetic, benzylmercaptoacetic, chloroacetic, fluoroacetic, trichloroacetic, trifluoroacetic, thioglycolic, m-nitrobenzoic, 2,3,4-trimethoxybenzoic, phenoxyacetic α-naphthoxyacetic and β-pyrrolidylpropionic acid; carbonic acids, e.g., carbamic acid, phenylcarbamic, n-butylcarbamic, dimethylcarbamic, diethylcarbamic and allophanic acid; a heterocyclic acid, e.g., β-furylcarboxylic, pyrrolecarboxylic, N-methylpyrrolidyl-2-carboxylic, α-picolinic, nicotinic, indole-2-carboxylic, 6-hydroxyindolyl-3-acetic and N-methylmorpholyl-2-carboxylic and pyrrolyl-2-carboxylic acid.

As stated above, although all of the above are acids whose acyl group can form the R group of the compounds of this invention, some will be less active and have a less favorable therapeutic ratio than the preferred acyl groups.

The compounds of this invention are valuable pharmaceuticals which influence the metabolism anabolically in mammals and other animals.

Examples of conventional compounds having an anabolic effect are 17β-acetoxy-1α,2α-methylene-4-androsten-3-one and 17β-acetoxy-1α,2α-methylene-4,6-androstadien-3-one ("Arzneimittel-Forschung" [Drug Research] 15 (1965), 1168).

The compounds of this invention exhibit a superior anabolic effectiveness and, moreover, a particularly favorable dissociation of the desired anabolic effect with respect to the undesired androgenic side effect, as can be seen from the activity data given for 17β-acetoxy-7α-methyl-1α,2α-methylene-4-androsten-3-one in the table below.

The results set forth in the table were determined on castrated male rats in the conventional levator ani/ seminal vesicle test, wherein the myotrophic effect on the perineal complex is determined as the anabolic effect and the growth of the seminal vesicle is determined by weight as the androgenic effect. In this connection, the comparison value employed is the dosage per animal with which a levator ani weight of 30–35 mg. per 100 g. of rat is obtained. The associated seminal vesicle weight is also set forth in mg. per 100 g. of rat.

TABLE

| Substance | Dosage (mg.) | Weight of— | |
|---|---|---|---|
| | | Levator ani (mg./100 g. of rat weight.) | Seminal vesicle (mg./100 g. of rat weight). |
| I. 17β-acetoxy-7α-methyl-1α,2α-methylene-4-androsten-3-one | 0.03 | 32 | 11 |
| II. 17β-acetoxy-1α,2α-methylene-4-androsten-3-one | 0.30 | 34 | 29 |
| III. 17β-acetoxy-1α,2α-methylene-4,6-androstadien-3-one | 1.00 | 31 | 28 |

It can be seen from the table that Compound I, the compound of the present invention has ten times the anabolic effectiveness of Compound II and 30 times the effectiveness of Compound III. In contradistinction to Compounds II and III, Compound I does not cause an increase in seminal vesicle weight.

As is known, a 7-methyl group exerts an influence on the androgenic and anabolic effectiveness of steroids of the androstane series (Julius A. Vida "Androgens and Anabolic Agents," Academic Press, New York and London, 1969).

It was expected that the presence of a 7α-methyl group in the compounds of this invention, if it had a favorable effect upon anabolic activity, would have a similar effect upon the undesired androgenic activity. Surprisingly, the compounds of this invention are practically devoid of androgenic activity and the dissociation between anabolic and androgenic effects is clearly apparent.

The novel compounds are useful in the treatment of catabolic states, i.e., where enhanced protein assimilation is desired, in the same manner as conventional anabolic agents, i.e., by administering systemically to the patient an amount effective to reduce the negative protein balance. Examples of situations where a catabolic state can exist are periods of convalescence poor general physical condition, consumption diseases, cachectic conditions, radiation and cytostasis therapy, in cases of anemia to promote erythropoiesis, long-term treatment with corticoids, osteoporosis, chronic liver and kidney diseases, hyperthyreosis, muscular dystrophy, diabetic retinopathy, in case of poorly progressing and dystrophic infants, growth disturbances, etc. The dosage depends, inter alia, on the graveness of the condition. Generally, a daily dose of 2–25 mg. is employed.

The compounds of this invention can be administered in admixture with vehicles and carriers conventionally employed in galenic pharmacy. Examples of such compositions are, for example, oily solutions in ampoules for intramuscular injection. Suitable for oral application, are, inter alia, tablets, capsules, pills, dragées, granules, suspensions, and solutions, containing 2 to 25 mg. of the active compound.

This invention also relates to a process for the production of the novel 7α-methyl-1α,2α-methylene-androstenolones of this invention which comprises:

(a) The 6,7-ring of 4 - chloro-17β-OR-1α,2α;6α,7α-dimethylene-4-androsten-3-one wherein R is as defined above, is opened with zinc in glacial acetic acid, with a simultaneous splitting off of hydrogen chloride; or (b) 17β - OR-1α,2α-methylene-4,6-androstadien-3-one, is subjected to a Grignard reaction with methylmagnesium halide in the presence of copper (I) chloride, and thereafter isomerizing the thus-obtained 7α-methyl-Δ$^5$-steroid to the corresponding 7α-methyl-Δ$^4$-steroid by an acid treatment; and (c) Optionally thereafter esterifying the 17β-hydroxy group or saponifying the 17β-acyloxy group of the thus-produced product.

In process (b) the Δ$^5$ isomer of the compounds of this invention produced as an intermediate, i.e., 17β-hydroxy-7α - methyl-1α,2α-methylene-5-androsten-3-one and 17β-acyloxy esters thereof, in addition to being useful as intermediates to the Δ$^4$-3-keto compounds of this invention, also possesses useful pharmacological activity, including anabolic activity.

The acid treatment is process (b) can be conducted at any acidic pH, preferably employing a strong organic or inorganic acid, e.g., dilute hydrochloric or sulfuric, chloroacetic, under conditions conventionally employed to cause a Δ$^5$ double bond of a 3-keto steroid to isomerize to the 4-position into conjugation with the 3-keto group. Such conditions are well known in the art. It will be apparent that if hydrolytic conditions are employed, when R is an acyl group, the 17-ester group can concurrently be partially or completely hydrolyzed to a 17-hydroxy group.

The optional saponification or esterification reaction is conducted according to conventional methods. Specifically, saponification with sodium or potassium hydroxide in an alcoholic solution or other alkaline hydrolysis system known to hydrolyze 17-ester groups can be employed. Esterification can be accomplished with an acid anhydride or other reactive acid derivative, e.g., in the presence of pyridine or p-toluenesulfonic acid as esterification catalyst.

Without further elaboration, it is believed that one skilled in the art can, using the preceding description, utilize the present invention to its fullest extent. The following preferred specific embodiments are, therefore, to the construed as merely illustrative, and not limitative of the remainder of the disclosure in any way whatsoever.

EXAMPLE 1

2.6 g. of 4-chloro-17β-acetoxy-1α,2α;6α,7α-dimethylene-4-androsten - 3 - one is heated under reflux in 45 ml. of glacial acetic acid with 2.5 g. of zinc dust for 1.5 hours. After the zinc dust has been filtered off, the solution is stirred into ice water. The precipitate is vacuum-filtered, washed with water, taken up in methylene chloride, and dried. By chromatography on silica gel and recrystallization from acetone/hexane, 260 mg. of 17β-acetoxy-7α-methyl-1α,2α-methylene-4-androsten - 3 - one is obtained, M.P. 153–153.5° C.

UV: $\epsilon_{240}$ = 14,300

EXAMPLE 2

A solution of methylmagnesium iodide, produced from 3.5 g. of magnesium filings and 13 ml. of methyl iodide in 100 ml. of ether, is diluted with 250 ml. of tetrahydrofuran. The solvent is distilled off until the boiling point is 62° C. Then, 750 mg. of a copper (I) chloride solution is added under vigorous agitation to the suspension cooled to room temperature, and immediately thereafter, a solution of 5 g. of 17β-acetoxy-1α,2α-methylene-4,6-androstadien-3-one is added dropwise thereto. The reaction mixture is stirred for 10 minutes and then mixed with saturated ammonium chloride solution. After extraction with ether, the reaction mixture is subjected to an acetylation with acetic anhydride in pyridine. By chromatography on silica gel with 5–6.8% acetone/hexane, 1.1 g. of 17β-acetoxy-7α - methyl-1α,2α-methylene-5-androsten-3-one is obtained, M.P. 121–122° C.; this product is isomerized in acetone with 0.2 ml. of 70% perchloric acid to 17β-acetoxy-7α-methyl-1α,2α-methylene - 4 - androsten-3-one, M.P. 155–156° C.

Yield: 460 mg.
UV: $\epsilon_{240}$ = 14,500

EXAMPLE 3

120 mg. of 17β-acetoxy-7α-methyl-1α,2α-methylene-4-androsten-3-one is stirred in 1.5 ml. of methylene chloride and 3.5 ml. of methanol with 2.0 ml. of 1 N sodium hydroxide solution for 1 hour at room temperature and under a nitrogen atmosphere. Then, the reaction is neutralized with acetic acid, extensively concentrated under vacuum, and the reaction product is extracted with methylene chloride; the thus obtained solution is washed with water and dried. By chromatographic purification, 70 mg. of 17β- hydroxy-7α-methyl-1α,2α-methylene - 4 - androsten-3-one is obtained in the form of a foam.

UV: $\epsilon_{240}=13,100$

EXAMPLE 4

110 mg. of 17β-hydroxy-7α-methyl-1α,2α-methylene-4-androsten-3-one is stirred in 0.5 ml. of pyridine with 0.3 ml. of propionic anhydride at room temperature. Then, the solution is diluted with methylene chloride and shaken several times with HCl (1:1) in order to separate the pyridine. Then, the reaction solution is neutralized with a solution of sodium bicarbonate and washed with water. After chromatography on silica gel with acetone/hexane and recrystallization from acetone/hexane, 60 mg. of 17β-propionyloxy-7α-methyl-1α,2α - methylene-4-androsten-3-one is obtained, M.P. 128-131° C.

UV: $\epsilon_{240}=13,800$

EXAMPLE 5

130 mg. of 17β-hydroxy-7α-methyl-1α,2α-methylene-4-androsten-3-one is stirred in 3.5 ml. of caproic anhydride at room temperature for 24 hours, with the addition of a catalytic amount of p-toluenesulfonic acid. The reaction mixture is diluted with acetone and subjected to steam distillation. Thereafter, the reaction product is extracted with methylene chloride, and the crude product is chromatographed on silica gel with acetone/hexane, thus eluting 45 mg. of 17β-hexanoyloxy - 7α - methyl-1α,2α-methylene-4-androsten-3-one in the form of an oil.

UV: $\epsilon_{240}=13,600$

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. 7α-methyl-1α,2α - methylene-androstenolones of the formula

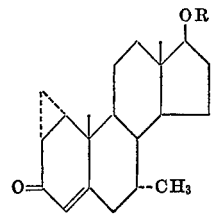

wherein R is hydrogen or acyl.
2. A compound of claim 1 wherein R is H.
3. A compound of claim 1 wherein R is the acyl radical of a hydrocarbon carboxylic acid containing up to 15 carbon atoms.
4. A compound of claim 3 wherein R is the acyl radical of an alkanoic acid containing 1-6 carbon atoms.
5. A compound of claim 1, 17β-acetoxy-7α-methyl-1α, 2α-methylene-4-androsten-3-one.
6. A compound of claim 1, 17β-hydroxy-7α-methyl-1α, 2α-methylene-4-androsten-3-one.
7. A compound of claim 1, 17β - propionyloxy - 7α-methyl-1α,2α-methylene-4-androsten-3-one.
8. A compound of claim 1, 17β-hexanoyloxy-7α-methyl-1α,2α-methylene-4-androsten-3-one.

References Cited
UNITED STATES PATENTS
3,338,928   8/1967   Beard et al. _____ 260—397.4

HENRY A. FRENCH, Primary Examiner

U.S. Cl. X.R.
260—999